United States Patent
Kawano et al.

(10) Patent No.: US 9,800,157 B2
(45) Date of Patent: Oct. 24, 2017

(54) SWITCHING REGULATOR

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 15/441,834

(22) Filed: Feb. 24, 2017

(65) Prior Publication Data

US 2017/0250606 A1 Aug. 31, 2017

(30) Foreign Application Priority Data

Feb. 26, 2016 (JP) ................. 2016-035932

(51) Int. Cl.
*H02M 1/08* (2006.01)
*H02M 3/156* (2006.01)
*H02M 3/158* (2006.01)
*H02M 1/00* (2006.01)

(52) U.S. Cl.
CPC ............. *H02M 3/158* (2013.01); *H02M 1/08* (2013.01); *H02M 3/156* (2013.01); *H02M 2001/0003* (2013.01); *H02M 2001/0025* (2013.01); *H02M 2001/0032* (2013.01); *H02M 2001/0048* (2013.01)

(58) Field of Classification Search
CPC .... H02M 3/155; H02M 3/156; H02M 3/1563; H02M 3/157; H02M 3/158; H02M 3/1588; H02M 2001/0003; H02M 2001/0006; H02M 2001/0025; H02M 2001/0032; H02M 2001/0048; H02M 1/08; Y02B 70/16

See application file for complete search history.

(56) References Cited

U.S. PATENT DOCUMENTS

| 6,768,655 | B1 * | 7/2004 | Yang | H02M 1/4225 323/222 |
|---|---|---|---|---|
| 8,970,199 | B2 | 3/2015 | Scoones et al. | |
| 2004/0140719 | A1 * | 7/2004 | Vulih | H02J 9/04 307/80 |
| 2010/0052628 | A1 * | 3/2010 | Khayat | H02M 3/157 323/234 |
| 2010/0156366 | A1 * | 6/2010 | Sakai | H02M 3/1588 323/282 |
| 2016/0079857 | A1 * | 3/2016 | Lo Iacono | H02M 3/156 323/271 |

* cited by examiner

*Primary Examiner* — Timothy J Dole
*Assistant Examiner* — Ivan Laboy Andino
(74) *Attorney, Agent, or Firm* — Brinks Gilson & Lione

(57) ABSTRACT

Provided is a switching regulator configured to suppress noise coupling, which may occur when a comparator is switched between a normal current operation and a low current consumption operation, to thereby operate stably. The switching regulator has a configuration in which switches are connected to input terminals of the comparator, and a feedback resistor having a large resistance value is disconnected from the input terminal of the comparator when switching is performed between the normal current operation and the low current consumption operation.

3 Claims, 3 Drawing Sheets

300

SWITCHING REGULATOR

RELATED APPLICATIONS

This application claims priority under 35 U.S.C. §119 to Japanese Patent Application No. 2016-035932 filed on Feb. 26, 2016, the entire content of which is hereby incorporated by reference.

BACKGROUND OF THE INVENTION

1. Field of the Invention

The present invention relates to a switching regulator, and more particularly, to a technology of reducing current consumption in a light load state.

2. Description of the Related Art

Electronic devices are demanded to have low power consumption. In particular, smartphones, mobile devices, wearable devices, and the like are battery driven, and hence demands for those electronic devices to have low power consumption are especially strong. A switching regulator is used as a voltage supply source in various electronic devices. The switching regulator is demanded to maintain a high efficiency even when currents that are supplied from an output terminal to a load vary over a wide range of from a low current to a high current.

FIG. 3 is a circuit diagram of a synchronous rectification type switching regulator 300 of the related art. The switching regulator 300 is formed of a feedback resistor 7, a comparator 10, a reference voltage circuit 12, an R-S flip-flop 13, an ON-time control circuit 14, an output control circuit 15, driver circuits 16 and 17, a comparator 18, power FETs 2 and 4, an inductor 3, and a capacitor 5 (see, for example, U.S. Pat. No. 8,970,199).

The feedback resistor 7 divides an output voltage VOUT so that a feedback voltage VFB is output. The reference voltage circuit 12 outputs a reference voltage VREF. The comparator 10 compares the feedback voltage VFB and the reference voltage VREF to each other, to thereby output a set signal. The R-S flip-flop 13 receives the set signal at a set terminal S thereof, and then outputs a high level signal from an output terminal Q thereof. The ON-time control circuit 14 receives the high level signal from the output terminal Q, and then outputs a reset signal to a reset terminal R after a predetermined amount of time. The R-S flip-flop 13 receives the reset signal at the reset terminal R thereof, and then outputs a low level signal from the output terminal Q.

The output control circuit 15 generates drive signals for the power FETs 2 and 4 based on the signal output from the output terminal Q of the R-S flip-flop 13.

The switching regulator 300 as described above achieves low power consumption by operating as follows.

In a heavy load mode, the power FETs 2 and 4 are the parts in the switching regulator 300 that mainly consume power. Therefore, in the switching regulator 300, the low power consumption and the high efficiency may be achieved by setting an ON resistance of the power FETs 2 and 4 to be small.

In a light load mode, the power consumption by the power FETs 2 and 4 is small, and hence the power loss is mainly due to the power consumption by circuits, for example, the comparator 10. Thus, an effective measure to achieve the low power consumption and high efficiency is to reduce the power loss of the comparator 10, for example.

For example, the comparator 18 compares a voltage at one end of the inductor 3 and a voltage at a GND terminal to each other, and outputs, when a relationship between the voltages is reversed, a detection signal to the comparator 10. The comparator 10 receives the detection signal from the comparator 18, and then shifts to a low current consumption operation in which an operation current is reduced.

For example, in general, the comparator 10 consumes a current in the order of from several microamperes to several tens of microamperes in normal operation. In order to maintain the high efficiency in the light load mode in which a load current is 1 µA or less or several microamperes, it is required that current consumption of the comparator 10 be suppressed to be 1 µA or less. Further, the feedback resistor 7 is required to have its resistance value set to from several megohms to several hundreds of megohms, to reduce current consumption thereof.

In the case in which the resistance value of the feedback resistor 7 is set to from several megohms to several hundreds of megohms, when the operation current of the comparator 10 is switched to a small current for the low current consumption operation, the feedback voltage VFB at an input terminal of the comparator 10 that is connected to the feedback resistor 7 tends fluctuate due to noise coupling. Further, because the resistance value of the feedback resistor 7 is large, a large amount of time is needed for the fluctuated feedback voltage VFB to return to a normal voltage. Therefore, the switching regulator has a problem in that an operation margin is decreased or a malfunction occurs.

SUMMARY OF THE INVENTION

In order to solve the problem of the related art, a switching regulator according to one embodiment of the present invention has the following configuration.

The switching regulator includes:

a feedback resistor for outputting a feedback voltage;

a reference voltage circuit configured to generate a reference voltage;

a comparator, which includes a first input terminal connected to an output terminal of the feedback resistor, and a second input terminal connected to an output terminal of the reference voltage circuit, and which is configured to compare the feedback voltage and the reference voltage to each other;

a light load mode detecting circuit configured to detect a light load mode;

a first switch arranged between the output terminal of the feedback resistor and the first input terminal; and a second switch arranged between the first input terminal and the second input terminal.

The switching regulator is configured to control, based on a signal output from the comparator, a power FET connected between a voltage input terminal and an output terminal, to thereby output a desired voltage.

The first switch is turned off and the second switch is turned on when the comparator switches an operation current based on a detection signal from the light load mode detecting circuit.

According to the switching regulator of the present invention, because the switches are connected to the input terminals of the comparator, and the feedback resistor having a large resistance value is disconnected from the input terminal of the comparator when switching is performed between a normal current operation and a low current consumption operation, noise coupling can be suppressed and a malfunction of the switching regulator can be suppressed.

DETAILED DESCRIPTION OF THE PREFERRED EMBODIMENTS

Figure 1:
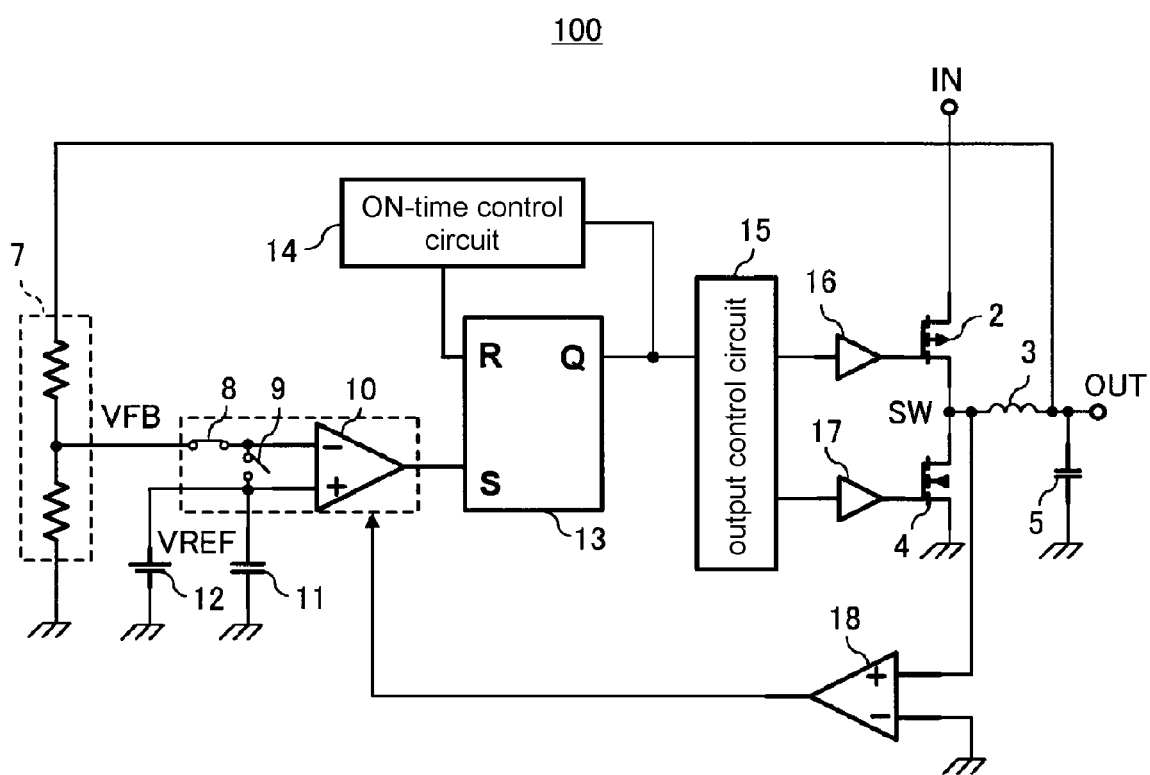
FIG. 1 is a circuit diagram for illustrating a switching regulator of an embodiment of the present invention.

FIG. 1 is a circuit diagram for illustrating a switching regulator 100 of an embodiment of the present invention.

The switching regulator 100 of this embodiment includes a feedback resistor 7, switches 8 and 9, a comparator 10, a capacitor 11, a reference voltage circuit 12, an R-S flip-flop 13, an ON-time control circuit 14, an output control circuit 15, driver circuits 16 and 17, a power FET 2, which serves as a high-side switching element, a power FET 4, which serves as a low-side switching element, an inductor 3, and a capacitor 5.

The feedback resistor 7 divides an output voltage VOUT, which is from an output terminal OUT, so that a feedback voltage VFB is output. The reference voltage circuit 12 outputs a reference voltage VREF. The comparator 10 compares the feedback voltage VFB and the reference voltage VREF to each other, to thereby output a detection signal. The R-S flip-flop 13 receives a set signal at a set terminal S thereof, and then outputs a high level signal from an output terminal Q thereof. The ON-time control circuit 14 receives the high level signal from the output terminal Q, and then outputs a reset signal to a reset terminal R after a predetermined amount of time. The R-S flip-flop 13 receives the reset signal at the reset terminal R thereof, and then outputs a low level signal from the output terminal Q. The output control circuit 15 generates drive signals for the power FETs 2 and 4 based on an output signal from the output terminal Q of the R-S flip-flop 13. The comparator 18 compares a voltage at one end of the inductor 3 and a voltage at a GND terminal to each other, and outputs, when a relationship between the voltages is reversed, a detection signal to the comparator 10. The comparator 10 receives the detection signal from the comparator 18, and then shifts to a low current consumption operation in which an operation current is reduced.

Next, the switches 8 and 9 are described.

The switch 8 is connected between an output terminal of the feedback resistor 7 and an inverting input terminal of the comparator 10. The switch 9 is connected between the inverting input terminal and a non-inverting input terminal of the comparator 10.

When the switching regulator 100 is operating in a heavy load mode, the switch 8 is turned on and the switch 9 is turned off. When the switches 8 and 9 are in this state, the switching regulator 100 has a circuit configuration that is the same as a general switching regulator. Further, the comparator 10 operates at a normal operation current.

When the switching regulator 100 shifts from the heavy load mode to a light load mode, the comparator 10 receives the detection signal from the comparator 18, and shifts to the low current consumption operation in which the operation current is reduced. For example, switching is performed between a first constant current source configured to cause a normal operation current to flow to the comparator 10, and a second constant current source configured to cause less current to flow to the comparator 10 as compared to the first constant current source.

When the comparator 18 outputs the detection signal, first, the switch 8 is turned off and the switch 9 is turned on. As a result, the inverting input terminal of the comparator 10 and the feedback resistor 7 are disconnected from each other, and the inverting input terminal and the non-inverting input terminal of the comparator 10 are connected to each other. Next, the comparator 10 shifts to the low current consumption operation in which the operation current is reduced. Then, the switch 8 is turned on and the switch 9 is turned off, and hence the switching regulator returns to a normal circuit configuration.

In this case, the switches 8 and 9 may be switched after a target node of the comparator 10 reaches a desired operating point, or comes close to a voltage thereof. Alternatively, each operation described above may be conducted in sequence at a desired timing using a timer circuit, for example.

Further, also when the switching regulator 100 shifts from the light load mode to the heavy load mode, the operation current of the comparator 10 is switched after the connections of the switches 8 and 9 are switched in the same manner as above.

As described above, when the comparator 10 switches from a normal current operation to the low current consumption operation, the inverting input terminal of the comparator 10 and the feedback resistor 7 are disconnected from each other. Therefore, the inverting input terminal is not affected by noise coupling. As a result, a malfunction of the switching regulator may be suppressed.

Further, the inverting input terminal and the non-inverting input terminal of the comparator 10 are connected to each other through the switch 9, and thus a voltage of the comparator 10 is set to the reference voltage VREF. In general, the reference voltage circuit 12 has a low output impedance, and thus has a high resistance to noise coupling. Even when the output impedance of the reference voltage circuit 12 is high, the impedance may be maintained to be low by adding the capacitor 11 so that the reference voltage circuit 12 may have a high resistance to noise coupling.

Figure 2:
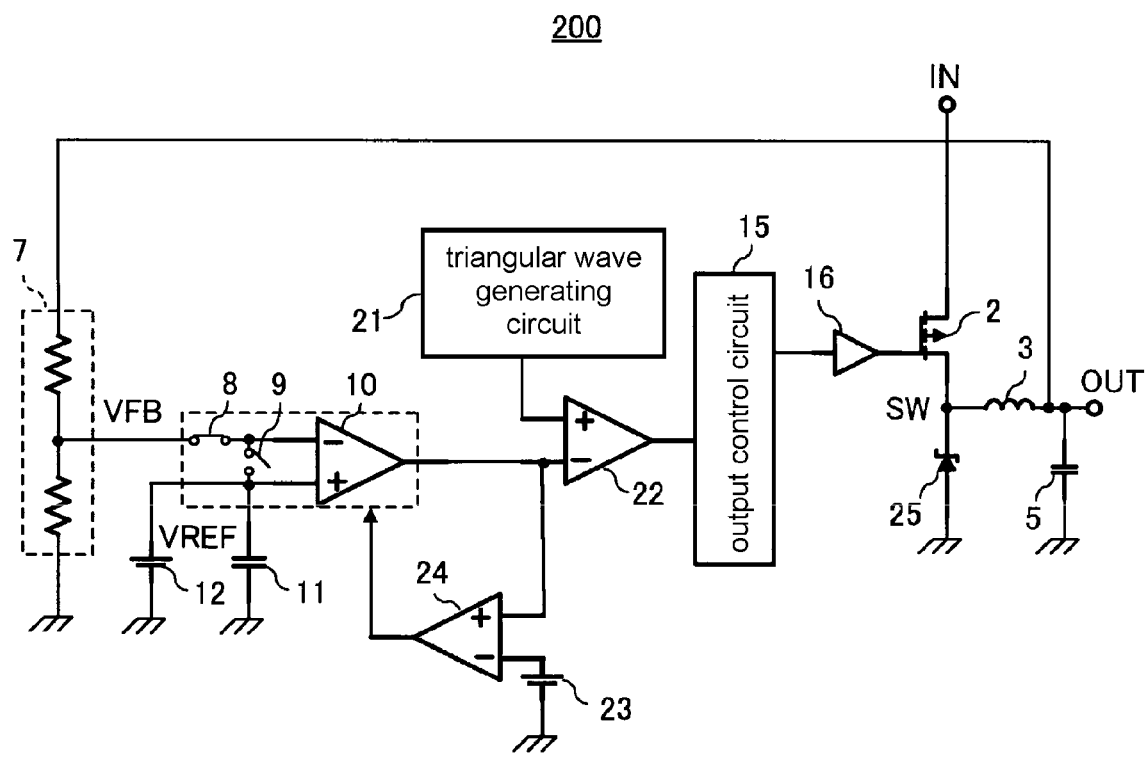
FIG. 2 is a circuit diagram for illustrating another example of the switching regulator of this embodiment.
Figure 3:
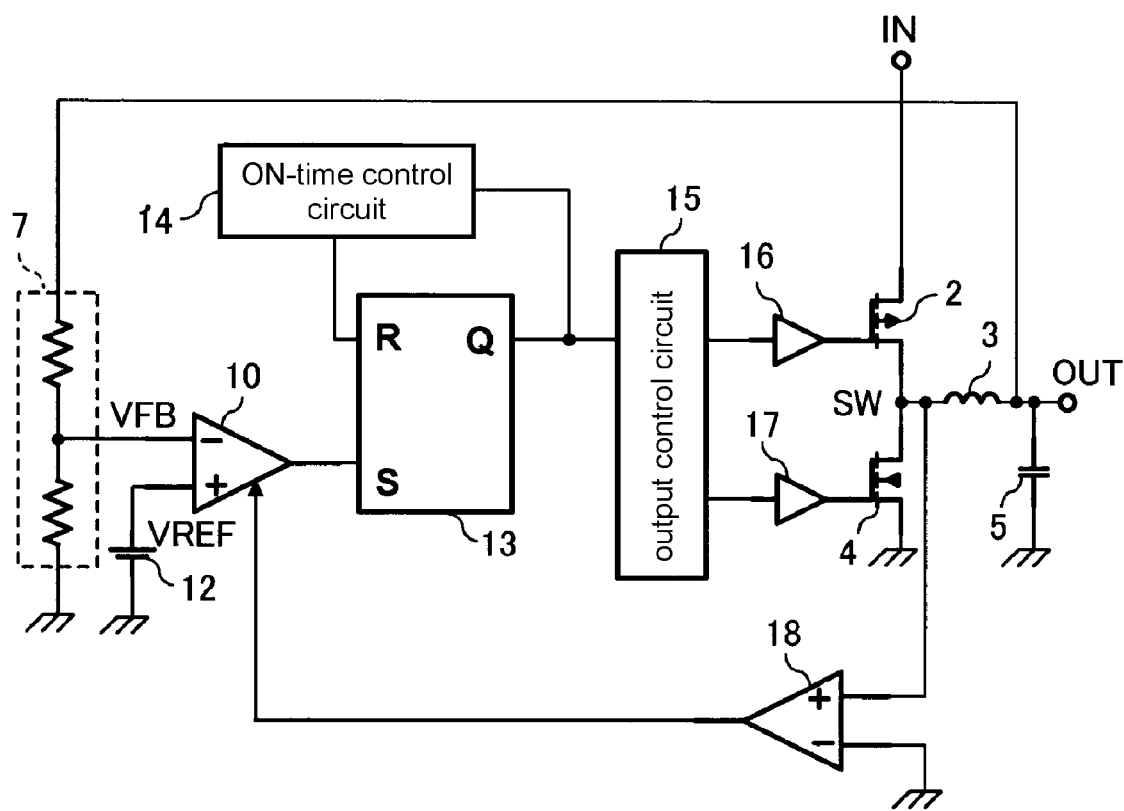
FIG. 3 is a circuit diagram for illustrating a synchronous rectification type switching regulator of the related art.

In the description of this embodiment, the synchronous rectification type switching regulator 100 is used, but the configuration of the switching regulator is not limited thereto and only needs to be adapted to the comparator, which is configured to detect the light load mode to switch the operation current. For example, the switching regulator may be a switching regulator 200 including a triangular wave generating circuit 21, an error amplifier 22, a reference voltage circuit 23, a comparator 24, and a Schottky diode 25, as illustrated in FIG. 2.

What is claimed is:

1. A switching regulator, comprising:
   a feedback resistor divider for outputting a feedback voltage representative of a voltage at an output terminal of the switching regulator;
   a reference voltage circuit configured to generate a reference voltage;
   a comparator, which includes a first input terminal connected to an output terminal of the feedback resistor divider, and a second input terminal connected to an output terminal of the reference voltage circuit, and which is configured to compare the feedback voltage and the reference voltage to each other;
   a light load mode detecting circuit configured to detect a light load mode;
   a first switch directly connected between the output terminal of the feedback resistor divider and the first input terminal of the comparator; and
   a second switch directly connected between the first input terminal of the comparator and the second input terminal of the comparator, the switching regulator being configured to control, based on a signal output from the comparator, a power FET connected between a voltage input terminal and the output terminal of the switching regulator, to thereby output a desired output voltage, the first switch being turned off and the second switch being turned on when the comparator switches an operation current based on a detection signal from the light load mode detecting circuit indicating the light load mode.

2. The switching regulator according to claim 1, wherein the light load mode detecting is configured to detect the light load mode based on a voltage at a coil connected to the output terminal of the switching regulator.

3. The switching regulator according to claim 1, wherein the light load mode detecting circuit is configured to detect the light load mode based on a signal from an output terminal of the comparator.

* * * * *